United States Patent
Lin et al.

(10) Patent No.: US 12,403,520 B2
(45) Date of Patent: Sep. 2, 2025

(54) FORMING METHOD OF DEEP CAVITY THIN-WALLED METAL COMPONENT WITH EXTREMELY SMALL FILLET RADIUS

(71) Applicant: DALIAN UNIVERSITY OF TECHNOLOGY, Dalian (CN)

(72) Inventors: Yanli Lin, Dalian (CN); Hang Yuan, Dalian (CN); Haihui Zhu, Dalian (CN); Zhubin He, Dalian (CN); Shijian Yuan, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 915 days.

(21) Appl. No.: 17/552,176

(22) Filed: Dec. 15, 2021

(65) Prior Publication Data
US 2023/0084149 A1 Mar. 16, 2023

(30) Foreign Application Priority Data
Sep. 10, 2021 (CN) .......................... 202111058410.8

(51) Int. Cl.
*B21D 22/20* (2006.01)
*G06F 30/17* (2020.01)
(Continued)

(52) U.S. Cl.
CPC .............. *B21D 22/20* (2013.01); *G06F 30/17* (2020.01); *G06F 30/20* (2020.01); *G06F 2113/24* (2020.01); *G06F 2119/18* (2020.01)

(58) Field of Classification Search
CPC ...... B21D 22/20; B21D 51/52; B21D 35/001; B21D 35/002; G06F 30/17; G06F 30/20; G06F 2113/24; G06F 2119/18
See application file for complete search history.

(56) References Cited

U.S. PATENT DOCUMENTS 7,623,939 B2 * 11/2009 Hillmann ........... G05B 19/4099
700/145
11,244,095 B2 * 2/2022 Zhu ........................ G06F 30/23
(Continued)

FOREIGN PATENT DOCUMENTS

| CN | 104182561 A | * 12/2014 | ......... G06F 17/5018 |
| CN | 107755511 A | 3/2018 | |

(Continued)

OTHER PUBLICATIONS

Yang CY, Yu JC, Lin BT. Optimum design of microridge deep drawing punch using regional Kriging assisted fuzzy multiobjective evolutionary algorithm. IEEE Access. Oct. 29, 2018;6:63905-14. (Year: 2018).*

(Continued)

*Primary Examiner* — Eunhee Kim
(74) *Attorney, Agent, or Firm* — Muncy, Geissler, Olds & Lowe, P.C.

(57) ABSTRACT

A forming method of a deep cavity thin-walled metal component with extremely small fillet radius is provided. In the forming method of a deep cavity thin-walled metal component with extremely small fillet radius, a global cavity is formed by deep drawing by means of a rigid die, an extremely small fillet is formed by means of aextrusion/pushing die, so that the deep drawing process is independent of the extremely small fillet forming process, and the problems of wrinkling, cracking and the like in the process of forming the two simultaneously are avoided. Thus, the problem that the extremely small fillet is difficult or impossible to form can be solved.

1 Claim, 5 Drawing Sheets

(51) Int. Cl.
   *G06F 30/20*       (2020.01)
   *G06F 113/24*      (2020.01)
   *G06F 119/18*      (2020.01)

(56) References Cited

U.S. PATENT DOCUMENTS

2013/0325424 A1* 12/2013 Zhu .................. G06F 30/23
                                                    703/6
2018/0285488 A1* 10/2018 Zhu .................. G06F 30/20

FOREIGN PATENT DOCUMENTS

| CN | 112950776 A    | * | 6/2021  | ............ G06F 30/17 |
| DE | 102013007352 A1 | * | 10/2014 | ............ B21D 22/20 |

OTHER PUBLICATIONS

Yao WA, Lihui LA, Sherkatghanad E, Nielsen KB, Zhang C. Design of an innovative multi-stage forming process for a complex aeronautical thin-walled part with very small radii. Chinese Journal of Aeronautics. Nov. 1, 2018;31(11):2165-75. (Year: 2018).*

Kang BS, Song WJ, Ku TW. Study on process parameters and its analytic application for nonaxisymmetric rectangular cup of multi-stage deep drawing process using low carbon thin steel sheet. The International Journal of Advanced Manufacturing Technology. Aug. 2010;49:925-40. (Year: 2010).*

Yang, Cheng-Yu, Jyh-Cheng Yu, and Bor-Tsuen Lin. "Optimum design of microridge deep drawing punch using regional Kriging assisted fuzzy multiobjective evolutionary algorithm." IEEE Access 6 (2018): 63905-63914. (Year: 2018).*

* cited by examiner

FORMING METHOD OF DEEP CAVITY THIN-WALLED METAL COMPONENT WITH EXTREMELY SMALL FILLET RADIUS

TECHNICAL FIELD

The present invention belongs to the field of forming and manufacturing of deep cavity thin-walled metal components, and particularly relates to a forming method of a deep cavity thin-walled metal component with extremely small fillet radius.

BACKGROUND

As a very important type of components in the fields such as aviation, aerospace, vehicles and G-series high-speed trains, thin-walled metal components are usually subjected to complex forces and thermal loads, so the dimension accuracy and dimension stability thereof are highly required. Meanwhile, in order to achieve reasonable and reliable assembly with other adjacent components, thin-walled metal components are generally designed into a structure with deep cavity, special-shaped cross section and local small fillet. As the requirements of aviation, aerospace, vehicles and other high-end equipment for light weight, high reliability, long service life and other indicators of structure are getting higher and higher, the structure and shape of thin-walled metal components are getting more and more complex, and the requirements for dimensional accuracy are getting higher and higher, a new challenge is put forward to the traditional forming and manufacturing technology. For example, in new-energy vehicles, square box-shaped aluminum alloy shells of lithium batteries are very important components used in large amount, wherein the cross section shape thereof is mainly square or rectangular, the depth reaches 100-300 mm, the transition fillet radius reaches 3-10 mm; and are typical deep cavity thin-walled metal components with extremely small fillet radii. For another example, in high-end electronic products, square box-shaped aluminum alloy, magnesium alloy or stainless steel shells are often used to install and fix internal electronic components, chips, etc., which are wide in variety and different in requirement. The design purpose of such deep cavity thin-walled metal component with extremely small fillet radius is mainly to minimize the gap between adjacent components when multiple same components are used in close arrangement and combination, enhance the overall stiffness of an assembling structure and improve the internal valid cavity volume of an independent component. At present, such metal shells have become the most important products in the industry of new-energy vehicles and high-grade electronic products, and the forming, manufacturing and mass production of such products represent the highest level of the advanced manufacturing industry.

At present, the deep cavity thin-walled metal component with extremely small fillet radius is manufactured mainly using the multi-pass rigid die deep drawing technology. In the technology, multi-pass deep drawing is performed on a planar metal slab using multiple sets of rigid punches and deep drawing female dies (progressive dies), a semi-finished product prepared in the former deep drawing pass is taken as a blank in the latter deep drawing pass, the blank is made to have a certain degree of deformation only in each pass, and necessary annealing and other heat treatment are performed on the blank between adjacent deep drawing passes generally. For an aluminum alloy sheet having poor forming performance at ambient temperature, there is a need of 6-8 passes of deep drawing to obtain a final deep cavity thin-walled metal component generally. If there is a problem in any aspect of the structural design of dies, matching of deformation amount of all deep drawing passes, and intermediate annealing heat treatment, the failure of the forming of the component may be directly caused. For example, when a special-shaped cross-section component is formed, due to asymmetric geometry of a rigid die and a blank, uneven and unreasonable stress of the blank, the deformation of each area of the original blank is uneven and unreasonable. The common forming defects or quality problems include: (1) uneven wall thickness distribution, which mainly refers to local thinning or even cracking of a sidewall near the bottom fillet area due to elongation deformation; (2) local wrinkling, which mainly refers to wrinkling of a transition area of a sidewall near a flange area due to uneven material flow and mutual extrusion; (3) poor dimensional stability and poor part-mould contact gap, which mainly refer to easy deformation of the sidewall and bottom after part-mould contact due to insufficient deformation of material and serious spring back; (4) limited local fillet dimension that can be achieved, which mainly refers to that when the fillet dimension of the transition area between sidewalls or between the sidewall and the bottom is too small, it is easy to wrinkle and unable to form a qualified part. In practice, when the component has extremely small fillet, that is, each of the sidewall fillet radius and the bottom fillet radius is less than 5.0 times the original slab wall thickness, the forming defects or quality problems may be more serious, so it is impossible to obtain the deep cavity thin-walled metal component with extremely small fillet meeting requirements by using the existing rigid die multi-pass deep drawing technology. Moreover, in addition to having complicated procedure and low production efficiency, the rigid die multi-pass deep drawing technology has high requirements for die machining accuracy and performance stability of original metal slab, and has high requirements for devices used. There is a need to use high-grade servo presses with high displacement/force load control accuracy, high stability and high speed, so the devices and dies are extremely expensive. Because of this, the technology of forming deep cavity thin-walled components by multi-pass rigid die deep drawing is not mature, which greatly restricts the wide application of such components to new-energy vehicles, high-grade electronic products. Patent for invention (patent No.: CN201610689208.8) proposes a bulging and pressing compound forming method for small fillet feature of thin-walled part. The method is used to form small fillets through two procedures of hydro-mechanical deep drawing and bulging and pressing compound forming, and is mainly used to form bottom small fillets of a deep cavity component. Bottom fillets and sidewall fillets of a deep cavity thin-walled box-shaped component cannot be formed simultaneously, and the dimension of the formed smallest fillet is still limited. When the dimension of a small fillet reaches 2.0 times material thickness at a minimum, the problems of sidewall instability, and protrusion of the transition area of fillet and straight line segment are easy to occur, so the above-mentioned method is no longer applicable.

In order to solve the problems in the existing forming technology of uneven wall thickness distribution, local wrinkling, poor part-mould contact gap, overlarge fillet dimension and insufficient accuracy due to unreasonable deformation of each area of an original blank resulted from irregular geometry of rigid die and blank and uneven and unreasonable stress of the blank when manufacturing a deep cavity thin-walled metal component with extremely small fillet radius, and the problems that the existing bulging and pressing compound forming technology has high requirements for liquid chamber pressure control, high-voltage power supply and high pressure sealing, there is a need to use a high-grade servo press, and bottom and surrounding small fillets can't be formed simultaneously, there is an urgent need to develop a novel forming and manufacturing method of a deep cavity thin-walled metal component with extremely small fillet radius.

SUMMARY

The purpose of the present invention is to provide a novel forming and manufacturing method, in order to solve the problems in the existing forming technology of uneven wall thickness distribution, local wrinkling, poor part-mould contact gap and insufficient local fillet dimension accuracy due to uneven deformation of each area of an original blank resulted from irregular geometry of rigid die and blank and uneven stress of the blank when manufacturing a deep cavity thin-walled metal component with extremely small fillet radius, and the problems that the existing bulging and pressing compound forming technology has high requirements for liquid chamber pressure control, high-voltage power supply and high pressure sealing, there is a need to use a high-grade servo press, and bottom and surrounding small fillets can't be formed simultaneously, which cause the problem that the deep cavity thin-walled metal component with extremely small fillet radius is extremely low in forming efficiency or unable to form.

The technical solution of the present invention is as follows:

A forming method of a deep cavity thin-walled metal component with extremely small fillet radius, comprising the following steps:

step 1. geometric analysis and process path determination of component with extremely small fillet radius: according to analysis of the cavity depth, cross section shape and dimension of a component, respectively formulating forming process paths of a global cavity and a local transition fillet; multi-stage deep drawing the global cavity by means of a rigid die, and locally extruding the local fillet by means of a extrusion/pushing die;

step 2. process parameter setting and parameter optimization: in combination with step 1, through theoretical analysis, determining multi-stage deep drawing part and final part key dimension parameters n, R, h, r and process parameters m, d, wherein the number of straight wall edges of sidewalls is n, each of the deep drawing bottom and sidewall fillet radii is R, the cavity depth is h, the number of deep drawing passes is m, the extrusion amount for extruding small fillets is d, and the radius of the extruded extremely small fillet is r; creating a multivariate function $f(R, m, n, r, d)=0$, assigning R, n, m to obtain a corresponding relationship between the extrusion amount d for extruding small fillets and the radius r of the extruded extremely small fillet, determining process parameters; through numerical simulation, analyzing global cavity deep drawing and local small fillet extrusion, optimizing the matching relationship between process parameters, to guarantee that both multi-pass deep drawing and small fillet extrusion are successfully performed;

step 3. design and machining of die tooling: designing and machining die tooling used for global cavity deep drawing and local small fillet extrusion according to the deep drawing part and final part key dimension parameters n, R, h, r and optimized process parameters m, d, which are determined in step 2, and determining the overall scheme of the die tooling and device parameter requirements;

step 4. rigid die deep drawing of global cavity: globally deep drawing an original thin-walled metal slab according to the process parameters set in step 2 by means of the global cavity deep drawing die designed and machined in step 3, obtaining the cavity depth, special-shaped cross section shape and dimension which are determined in step 2 and are consistent with that of a final deep cavity thin-walled metal component, each of the obtained sidewall and bottom fillet radii being about 2.0 to 4.0 times of the fillet radius required for the final metal component;

step 5. rigid die extrusion of local fillet: further extruding the semi-finished global cavity obtained in step 4 according to the process parameters set in step 2 by means of the local extrusion die designed and machined in step3, further reducing the sidewall and bottom fillet radii to the fillet dimension (1.0-3.0 times of wall thickness) meeting requirements on the premise of guaranteeing that most areas of the global cavity are not deformed;

and step 6. local trimming of flange edge area: performing flange edge cutting or sidewall punching on the semi-finished product of which the global cavity and local fillets meet final metal component requirements, which is obtained in step 5, obtaining a final deep cavity thin-walled metal component with extremely small fillet radius.

The present invention has the following beneficial effects:

(1) In the forming method of a deep cavity thin-walled metal component with extremely small fillet radius, a global cavity is formed by deep drawing by means of a rigid die, an extremely small fillet is formed by small fillet extrusion by means of a rigid die, so the deep drawing process is independent of the extremely small fillet forming process, and the problems of wrinkling, cracking and the like in the process of forming the two simultaneously are avoided. Thus, the problem that the extremely small fillet is difficult or impossible to form can be solved.

(2) In the forming method of a deep cavity thin-walled metal component with extremely small fillet radius, in the deep drawing process in step 1, each of the bottom and sidewall small fillet radii may be set to be 2.0-5.0 times of a target fillet radius, the phenomena of uneven and unreasonable material flow may be reduced, the problems of excessive thinning of the deep drawing sidewall near a bottom fillet area and serious wrinkling of a top flange fillet area may be effectively reduced, and the problem of uneven and unreasonable distribution of wall thickness may be solved.

(3) In the forming method of a deep cavity thin-walled metal component with extremely small fillet radius, in the small fillet extrusion process in step 2, it is guaranteed that a straight wall segment is not deformed under constraint conditions by constraining and extruding a sidewall, and a big fillet in the fillet area is extruded into a small fillet, so the problems of poor part-mould contact gap in the fillet area and insufficient local fillet dimension accuracy can be effectively solved.

(4) In the forming method of a deep cavity thin-walled metal component with extremely small fillet radius, in the deep drawing process and the local fillet extrusion process, the devices used are only an ordinary press and an extrusion mechanism with a lateral loading unit. The dependence on die machining accuracy, material stability and high-grade servo device can be effectively reduced.

(5) In the forming method of a deep cavity thin-walled metal component with extremely small fillet radius, the method of global cavity deep drawing plus local small fillet extrusion has strong pertinence and strong operability, the requirements for dimensions of all fillets formed by deep drawing are loosened, the number of passes of deep drawing may be substantially reduced, and the formability and forming efficiency of the deep cavity thin-walled metal component with extremely small fillet radius may be effectively improved.

(6) The forming method of a deep cavity thin-walled metal component with extremely small fillet radius of the present invention may be applied to deep drawing-extrusion of deep cavity thin-walled metal components with extremely small fillet radii in different cross section shapes (such as square cross section, trapezoidal cross section, etc.), an extremely small fillet radius may be formed by using small extrusion amount only, the coordinability between the previous process and the latter process is strong, mass production of deep cavity thin-walled components with extremely small fillet radii may be achieved, and costs may be substantially reduced.

DESCRIPTION OF DRAWINGS

FIG. 4(a) is an initial-pass deep drawing component, FIG. 4(b) is an intermediate-pass deep drawing component, FIG. 4(c) is a final-pass deep drawing component;

FIG. 5(a) is a schematic diagram showing bottom fillet extrusion, FIG. 5(b) is a schematic diagram showing circumferential fillet extrusion;

In the figures: 1. deep cavity thin-walled component with extremely small fillet radius; 2. initial-pass deep drawing component; 3. Intermediate-pass deep drawing component; 4. Final-pass deep drawing component; 5. internal support mechanism for extrusion; 6. internal support plate for extrusion; 7. external support plate for extrusion; 8. deep drawn blank; 9. extruded blank; r—extremely small fillet radius; t—part wall thickness, h—cavity depth; R—deep drawing fillet radius; d—single side extrusion amount; L—straight wall segment length before extrusion; l—straight wall segment length after extrusion; V—external support plate displacement; F—internal support plate back pressure.

DETAILED DESCRIPTION

Specific embodiments of the present invention are further described below in combination with the drawings and the technical solution.

Figure 6:
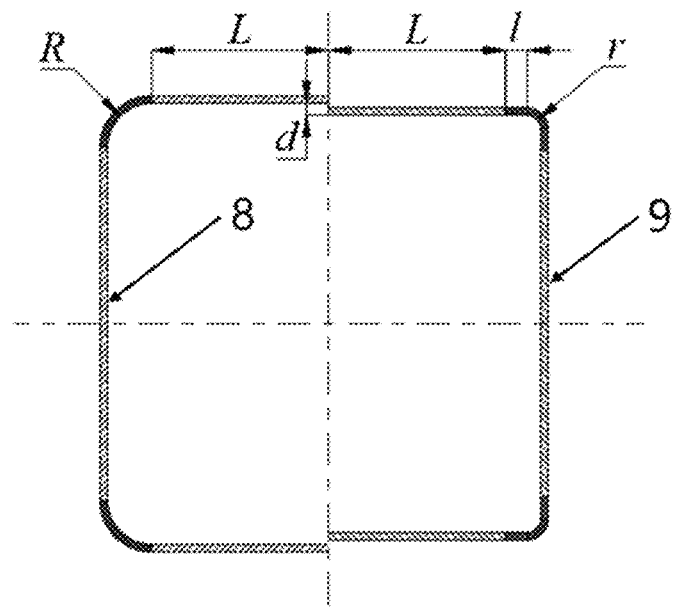
FIG. 6 is a schematic diagram showing the change in cross section shape and dimension before and after the small fillet extrusion of the present invention.
Figure 7:
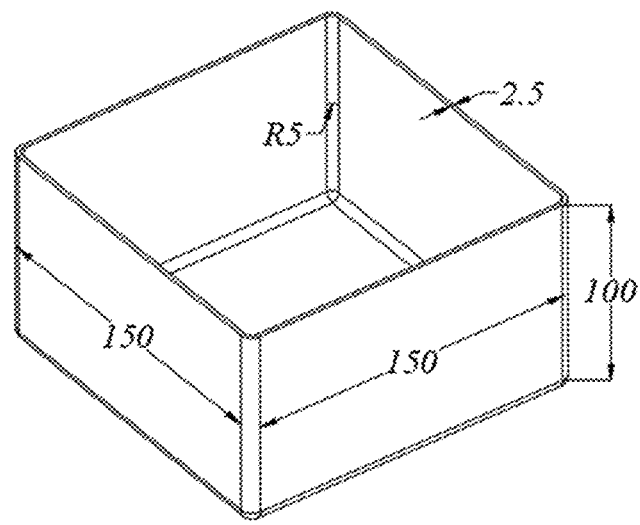
FIG. 7 is a diagram showing the dimension of the square box-shaped deep cavity thin-walled component.

Embodiment 1: FIG. 1, FIG. 2, FIG. 3, FIGS. 4(a) to 4(c), FIGS. 5(a) and 5(b), and FIG. 6 illustrate a forming method of a deep cavity thin-walled metal component with extremely small fillet radius of the present invention, the method being implemented by the following steps:

Step 1. geometric analysis and process path determination of thin-walled component: FIG. 6 shows the part given in the embodiment, wherein the part has a cavity depth of 100 mm, a wall thickness of 2.5 mm, and a fillet radius of a transition small fillet of 5 mm, and is a typical deep cavity thin-walled metal component with extremely small fillet radius. This component has a diameter-to-thickness ratio of 2 at the small fillet, and is difficult to form only by deep drawing. It is determined that the forming process of the global cavity is rigid die multi-pass deep drawing and the forming process of local small fillets is rigid die extrusion.

Step 2. process parameter setting and parameter optimization: by taking a square box-shaped part as an example, assuming that the circumferential perimeter is constant, it is obtained through theoretical analysis that the quantitative relationship between the single side extrusion amount of the sidewall and the bottom and the change in small fillet dimension is $$d = R - r - l = \frac{(4-\pi)(R-r)}{4} = 0.215(R-r),$$

wherein when the fillet radius changes from 10 mm to 5 mm, the single side extrusion amount is 1.075 mm; when the fillet radius changes from 15 mm to 5 mm, the single side extrusion amount is 2.150 mm; and when the fillet radius changes from 20 mm to 5 mm, the single side extrusion amount is 3.225 mm. Considering that the smaller the extrusion amount, the higher the success rate of extrusion, and the larger the fillet radius, the simpler the deep drawing, it is preliminarily determined that the deep drawing fillet dimension is 15 mm, the number of deep drawing passes is 3, and the cavity depths after deep drawing of all passes are 50 mm, 80 mm and 100 mm. Through numerical simulation, the deep drawing and local small fillet extrusion of the part are analyzed, the preliminarily determined parameters are optimized, and the part dimension and main process parameters at each forming stage are determined.

Step 3. design and machining of die tooling: designing and machining die tooling used for global cavity deep drawing and local small fillet extrusion according to the deep drawing part dimension and process parameters, which are determined in step 2. The dimension of the deep drawing die is determined according to the dimension of the deep drawing part, and other portions are designed according to the design standard of the deep drawing die. The dimensions of the internal and external support plates at the side and bottom of the die for small fillet extrusion are reasonably selected according to the part dimension, it is required to guarantee that the internal and external support plates are consistent with the part in sidewall and bottom contour shape, a moveable support plate is used internally, which may be retreated during extrusion, and a rigid extruding plate is used externally, which is fixed to a feeding mechanism to achieve an extrusion function.

Step 4. rigid die deep drawing of global cavity: performing multi-pass global deep drawing on an original thin-walled metal slab by means of the global deep drawing die in step 3, obtaining the cavity depth, special-shaped cross section shape and dimension which are basically consistent with that of a final deep cavity thin-walled metal component, each of the fillet radius between sidewalls and the fillet radius between each sidewall and the bottom being 15 mm, which is 3.0 times of the fillet radius required for the final metal component.

Step 5. rigid die extrusion of local fillet: further extruding the semi-finished global cavity obtained in step 4 by means of the local extrusion die in step 3, further reducing the sidewall and bottom fillet radii to 5 mm, which is 2.0 times of wall thickness of the original slab on the premise of guaranteeing that most areas of the global cavity are not deformed.

Step 6. local trimming of flange edge area: performing flange edge cutting or sidewall punching on the semi-finished product of which the global cavity and local fillets meet final metal component requirements, which is obtained in step 5, obtaining a final deep cavity thin-walled metal component with extremely small fillet radius.

This embodiment has the beneficial effect that: by means of the process of multi-pass deep drawing plus local small fillet extrusion, the problem that the small fillet of a deep cavity thin-walled metal component is difficult or impossible to form can be solved. By enlarging the dimension of a deep drawing transition fillet, the problems of uneven and unreasonable material flow can be reduced, and the problems of wrinkling, cracking and uneven wall thickness distribution easily occurring when forming a component with extremely small fillet radius using the traditional multi-pass deep drawing can be solved to a certain extent. A theoretical model is built by geometric analysis to determine a quantitative relationship between the extrusion process parameters and the deep drawing component dimensions, and optimization is performed by finite element simulation to determine the most reasonable process parameters, so as to provide guidance for die design and machining, being beneficial to coordinate the relationship between former process and latter process, thus reducing the forming difficulty of each procedure, and improving the formability of the deep cavity thin-walled part with extremely small fillet.

Figure 5A:
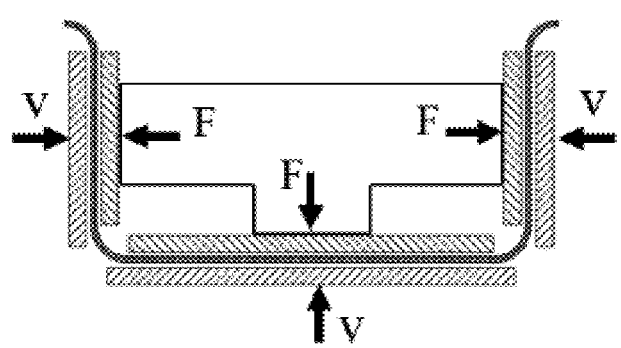
FIGS. 5(a) and 5(b) are schematic diagrams showing small fillet extrusion by means of the rigid die of the present invention, where
Figure 5B:
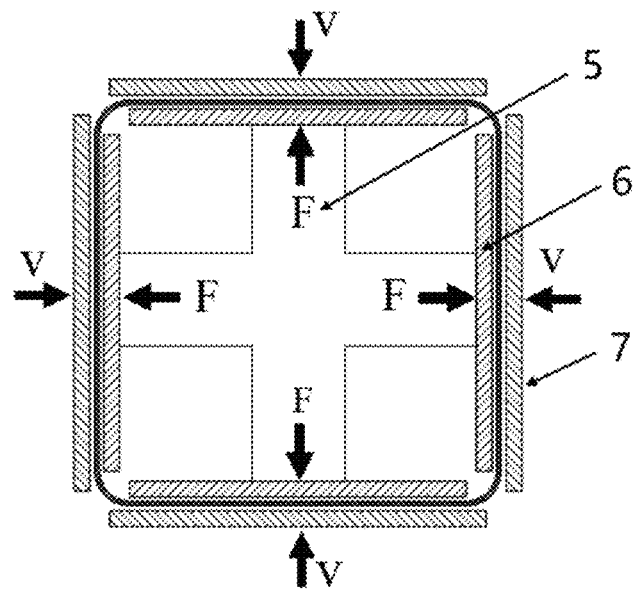

Embodiment 2: referring to FIGS. 5(a) and 5(b), in step 1 to step 5, geometric analysis is pertinently performed on different parts made of different materials or having different cross section shapes, to catch the essential factor that the cross section circumference remains unchanged before and after extrusion, that is, during extrusion, only the shape changes but no compression occurs, and the straight wall segment does not change, deformation is mainly concentrated in a fillet area, the main form of deformation being the bending of large fillets into small fillets. According to a specific component cross section shape, a theoretical model is built to coordinate the relationship between extrusion amount and deep drawing fillet dimension. If the deep drawing of small fillets is difficult to achieve, the deep drawing fillet dimension can be enlarged to reduce the difficulty of deep drawing, and the dimension requirements can also be achieved by increasing the extrusion amount. If extrusion is difficult to achieve, the deep drawing fillet dimension can be reduced to reduce the extrusion amount, so as to reduce the difficulty of extrusion. Other steps are the same as in embodiment 1.

This embodiment has the beneficial effect that: for parts made of different materials or having different structure shapes and extremely small fillet dimensions, a coordination relationship between the deep drawing fillet dimension and extrusion amount during extrusion can be determined flexibly, to achieve the dimension accuracy requirements of components finally. This embodiment indicates that there is a certain adjustment space for the relationship between the procedures before and after the forming process of this method, so the problem of increasing the difficulty of the whole forming and even using high-grade special devices because of the difficulty of forming in a certain procedure can be avoided.

Figure 1:
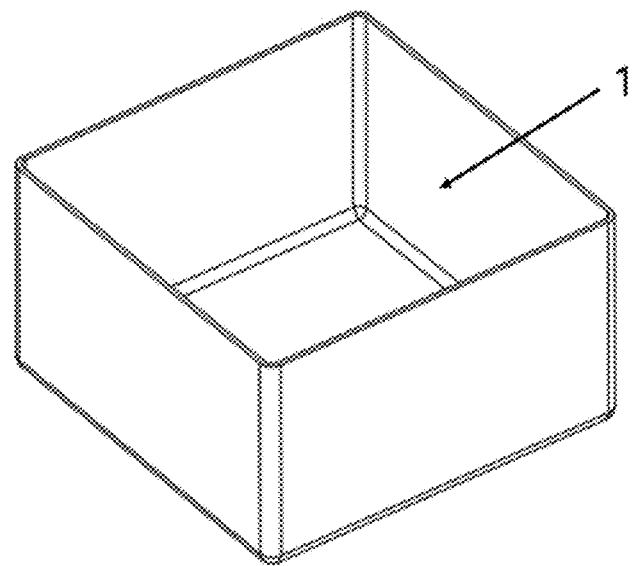
FIG. 1 is a schematic diagram of the deep cavity thin-walled metal component with extremely small fillet radius of the present invention.
Figure 2:
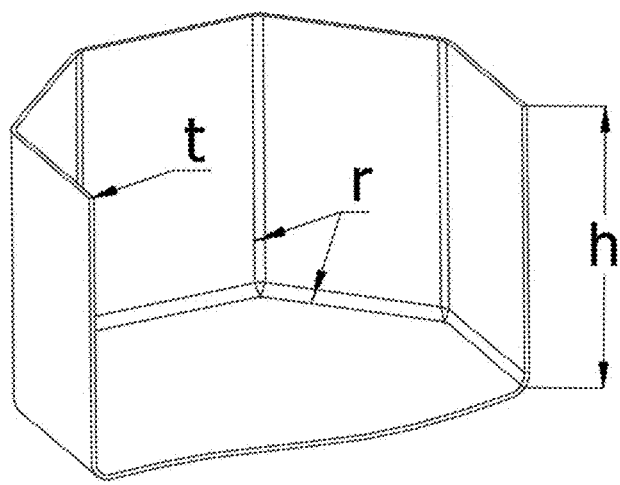
FIG. 2 is schematic diagram showing the dimension of the deep cavity thin-walled component with extremely small fillet radius in general.
Figure 3:
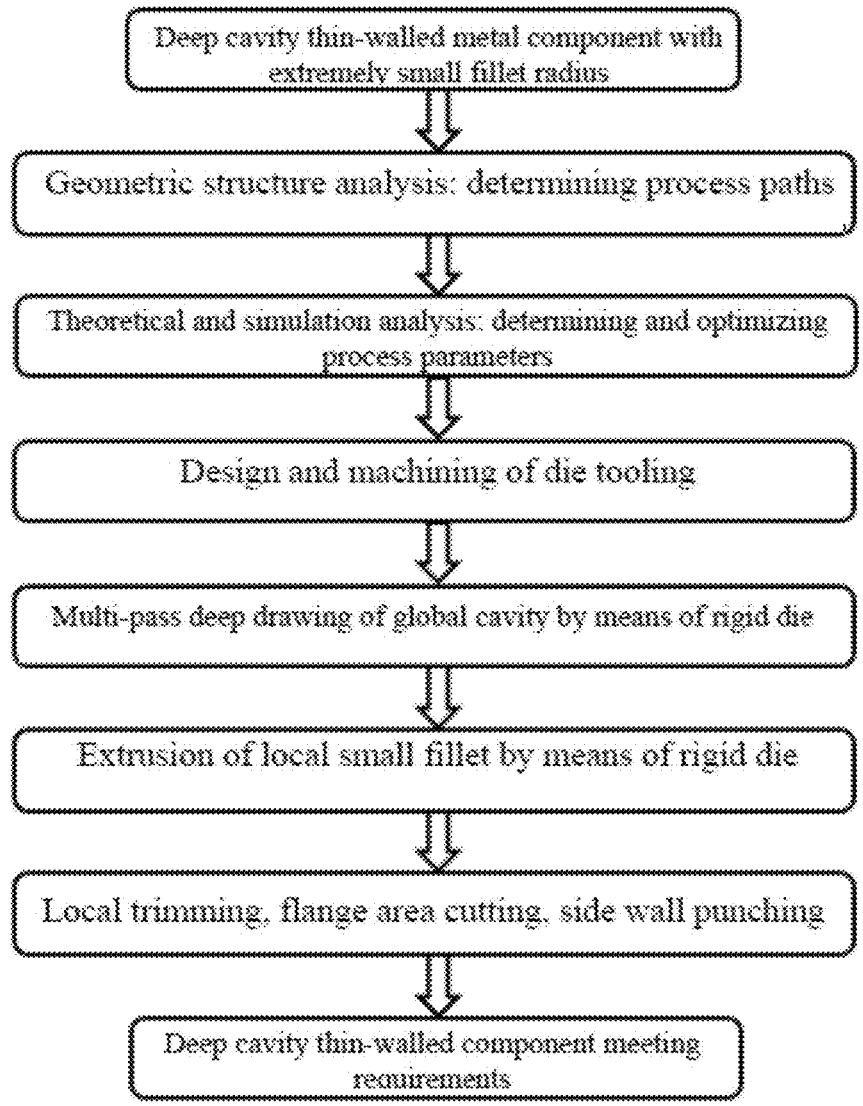
FIG. 3 is a flow chart of the forming method of the present invention.
Figure 4A:
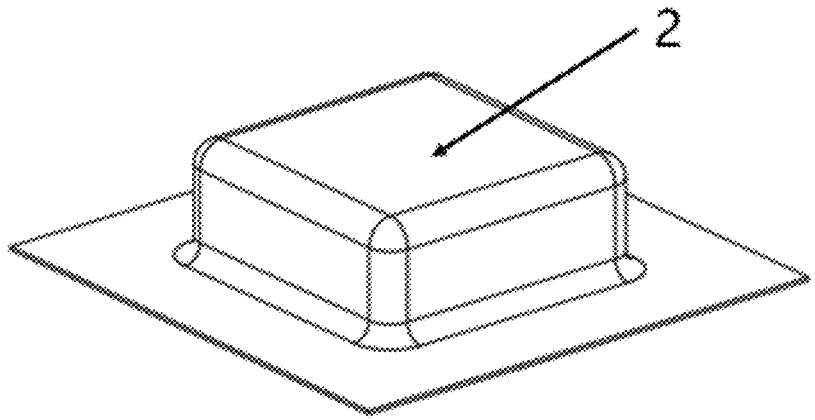
FIGS. 4(a) to 4(c) are schematic diagrams showing multi-pass deep drawing by means of the rigid die of the present invention, where
Figure 4B:
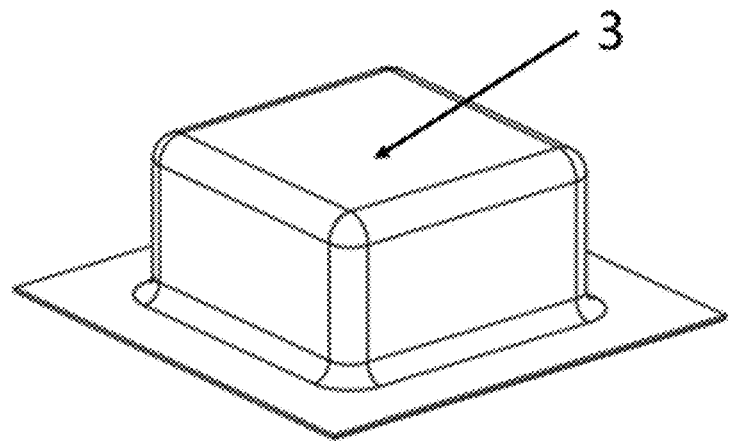
Figure 4C:
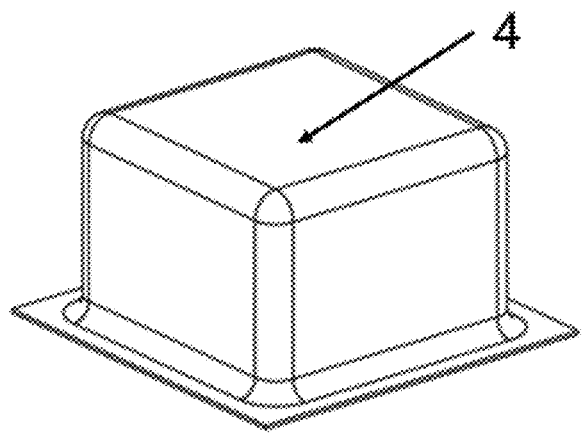

Embodiment 3: referring to FIGS. 4(a) to 4(c), in step 1 to step 5, the extrusion sequence of side and bottom fillets should be considered during extruding small fillets. The process parameters are determined and die tooling is designed according to the determined extrusion sequence. Priority is given to simultaneous extrusion in all directions, which can make the deformation of the junction area of one fillet and the other fillet more coordinated. Alternatively, separate extrusion may be performed, separate extrusion and bottom extrusion may be performed horizontally in two directions, and at this moment, the coordinated deformation of the junction area may be controlled through different extrusion amount, so that small fillet extrusion is successfully performed, obtaining parts meeting dimension accuracy requirements. Other steps are the same as in embodiment 1.

This embodiment has the beneficial effect that: the extrusion sequence is reasonably selected according to different forming difficulties, and the flexibility of process paths and the adjustable space for setting the process parameters are increased. On the other hand, simultaneous extrusion requires simultaneous feeding in multiple directions and requires controlling coordination between devices; and separate extrusion is relatively simple, is low in requirement for devices, and is easy to carry out. That is, at different device levels and die manufacturing levels, small fillets can be extruded. This embodiment shows that the method provided by the present invention has good applicability.

Embodiment 4: referring to FIGS. 4(a) to 4(c), in step 1 to step 5, for small fillets which cannot be formed by deep drawing but can be formed by extrusion with small extrusion amount, the internal support mode of rigid die extrusion can be selected pertinently. If small fillets can be formed in the case where the internal support pressure required is not too high, priority can be given to hydraulic support. At this moment, the pressure is not high, the requirements for sealing and high-pressure systems are not high, and the implementation is relatively simple. If internal support is required to provide high pressure in the case where the extrusion amount is large, rigid support may be selected, for example, a nitrogen spring is internally arranged, or the retreat action of the internal support plate during extrusion is synchronously achieved by means of wedge, or other mechanical structures. At this moment, the problems of leakage, low efficiency and the like of high-pressure sealing and high-pressure systems can be avoided. Other steps are the same as in embodiment 1.

This embodiment has the beneficial effect that: when different internal pressure supports are required in the case where parts made of different materials or having different structure shapes and extremely small fillet dimensions are formed, the internal support mode of the sidewalls and bottom can be flexibly selected. The relationship among feasibility, cost and efficiency is considered comprehensively to maximize the benefit.

The invention claimed is:

1. A method for forming a cavity metal component with fillet radius, comprising the following steps:

step 1. according to analysis of the cavity depth, cross section shape and dimension of a component, respectively formulating forming process paths of a global cavity and a local transition fillet; multi-stage deep drawing the global cavity by means of a rigid die, and locally extruding the local fillet by means of an extrusion/pushing die;

step 2. in combination with step 1, through theoretical analysis, determining multi-stage deep drawing part and final part key dimension parameters n, R, h, r, and process parameters m, d, wherein the number of straight wall edges of sidewalls is n, each of the deep drawing bottom and side wall fillet radii is R, the cavity depth is h, the number of deep drawing passes is m, an extrusion amount for extruding fillets is d, and the radius of the extruded fillet is r; creating a multivariate function $f(R, m, n, r, d)=0$, assigning R, n, m to obtain a corresponding relationship between the extrusion amount de for extruding small fillets and the radius r of the extruded fillet; through numerical simulation, analyzing global cavity deep drawing and local fillet extrusion, and optimizing a matching relationship between process parameters m, d, to guarantee that both multi-pass deep drawing and fillet extrusion are performed;

step 3. designing and machining die tooling used for performing global cavity deep drawing and local fillet extrusion according to the deep drawing part and final part key dimension parameters n, R, h, r and optimized process parameters m, d, which are determined in step 2, and determining an overall scheme of the die tooling and device parameter requirements;

step 4. globally deep drawing an original metal slab according to the process parameters set in step 2 by means of the global cavity deep drawing die designed and machined in step 3, obtaining the cavity depth, cross section shape and the final part key dimension which are determined in step 2 and are consistent with a final cavity metal component, each of the obtained sidewall and bottom fillet radii being 2.0 to 4.0 times of the fillet radius required for a final metal component;

step 5. further extruding global cavity obtained in step 4 according to the process parameters set in step 2 by means of the die tooling in step 3, further reducing the sidewall and bottom fillet radii to the fillet dimension (1.0-3.0 times of wall thickness);

and step 6. performing flange edge cutting or sidewall punching on the global cavity, which is obtained in step 5, obtaining the final cavity metal component with fillet radius.

* * * * *